(12) United States Patent
Komiyama

(10) Patent No.: US 6,769,646 B1
(45) Date of Patent: Aug. 3, 2004

(54) AIRCRAFT

(75) Inventor: Masaru Komiyama, Higashi-yamanashi-gun (JP)

(73) Assignee: Katsunuma Rikuso Co., Ltd., Yamanashi (JP)

( * ) Notice: Subject to any disclaimer, the term of this patent is extended or adjusted under 35 U.S.C. 154(b) by 0 days.

(21) Appl. No.: 10/355,974

(22) Filed: Jan. 31, 2003

(51) Int. Cl.$^7$ .............................................. B64D 11/00
(52) U.S. Cl. ................................ 244/118.5; 244/129.1; 340/945
(58) Field of Search ..................... 244/118.5, 129.1; 109/3, 5, 6, 7; 340/945, 963

(56) References Cited

U.S. PATENT DOCUMENTS

| | | | | |
|---|---|---|---|---|
| 3,704,845 A | * | 12/1972 | Ord ......................... | 244/118.5 |
| 3,811,643 A | * | 5/1974 | Pizzo ....................... | 244/118.5 |
| 4,679,610 A | * | 7/1987 | Spraggins ................. | 160/107 |
| 6,186,211 B1 | * | 2/2001 | Knowles ................... | 160/84.02 |
| 2002/0158166 A1 | * | 10/2002 | Lin ........................... | 244/118.5 |
| 2003/0052227 A1 | * | 3/2003 | Pitman ..................... | 244/118.5 |
| 2003/0062447 A1 | * | 4/2003 | Cordina et al. .......... | 244/118.5 |
| 2003/0062448 A1 | * | 4/2003 | Takeshima ............... | 244/118.5 |
| 2003/0066929 A1 | * | 4/2003 | Valencia et al. ......... | 244/118.5 |
| 2003/0094541 A1 | * | 5/2003 | Zeinch ..................... | 244/118.5 |

OTHER PUBLICATIONS

"Hijack–Proof Planes" Halfbakery.com Sep. 12–14, 2001.*

* cited by examiner

*Primary Examiner*—Galen L. Barefoot
(74) *Attorney, Agent, or Firm*—Jordan and Hamburg LLP

(57) ABSTRACT

An aircraft includes a cover wall without a door so that passengers cannot go back and forth between a flight deck and a cabin. A device for indicating urgent closing is provided in one of the flight deck and cabin, and a closing control part which closes information machines and equipment so that information regarding activity of the passengers in the cabin does not transmit to the flight deck when the urgent closing indication means indicates an urgent closing state. A device for communicating outside of the aircraft is provided at the cabin, allowing communication with the outside, so that suicidal-explosion terrorism can be prevented.

12 Claims, 5 Drawing Sheets

AIRCRAFT

BACKGROUND OF THE INVENTION

This invention relates to an aircraft which prevents hijacking of the aircraft and which does not allow the aircraft to be used as an instrument of destruction in furtherance of terrorism.

In conventional aircraft, including those used for passenger flights, the structure and system allows a hijacker to invade a flight deck from the cabin room and permits observation of the situation of a cabin room from the flight deck side.

In the conventional technology, the hijacker takes the attendants and passengers hostage, indicates the place where he has gone to a captain, requests to invade into the flight deck and intrudes into the flight deck when the attendants enter the flight deck. Under such circumstances, the judgment of the situation is left to the captain. For this reason, the capturing of the flight deck of the aircraft in the United States on Sep. 11, 2001 allowed the aircraft to collide with the World Trade Center.

SUMMARY OF THE INVENTION

In light of the forgoing, it is an object of the invention to provide an aircraft which can protect the occurrence of hijacking. In addition, it is another object of the invention to provide an aircraft which cannot be commandeered to function as suicidal-explosion instrument for terrorism.

Novel features which are believed to be characteristic of the invention, both as to its organization and method of operation, together with further objects and advantages thereof, are described below with reference to the accompanying drawings in which preferred embodiments of the invention are illustrated by way of example.

It is to be expressly understood, however, that the drawings are for the purpose of illustration and description only, and are not intended as a definition of the limits of the invention.

DETAILED DESCRIPTION OF THE PREFERRED EMBODIMENTS

Figure 1:
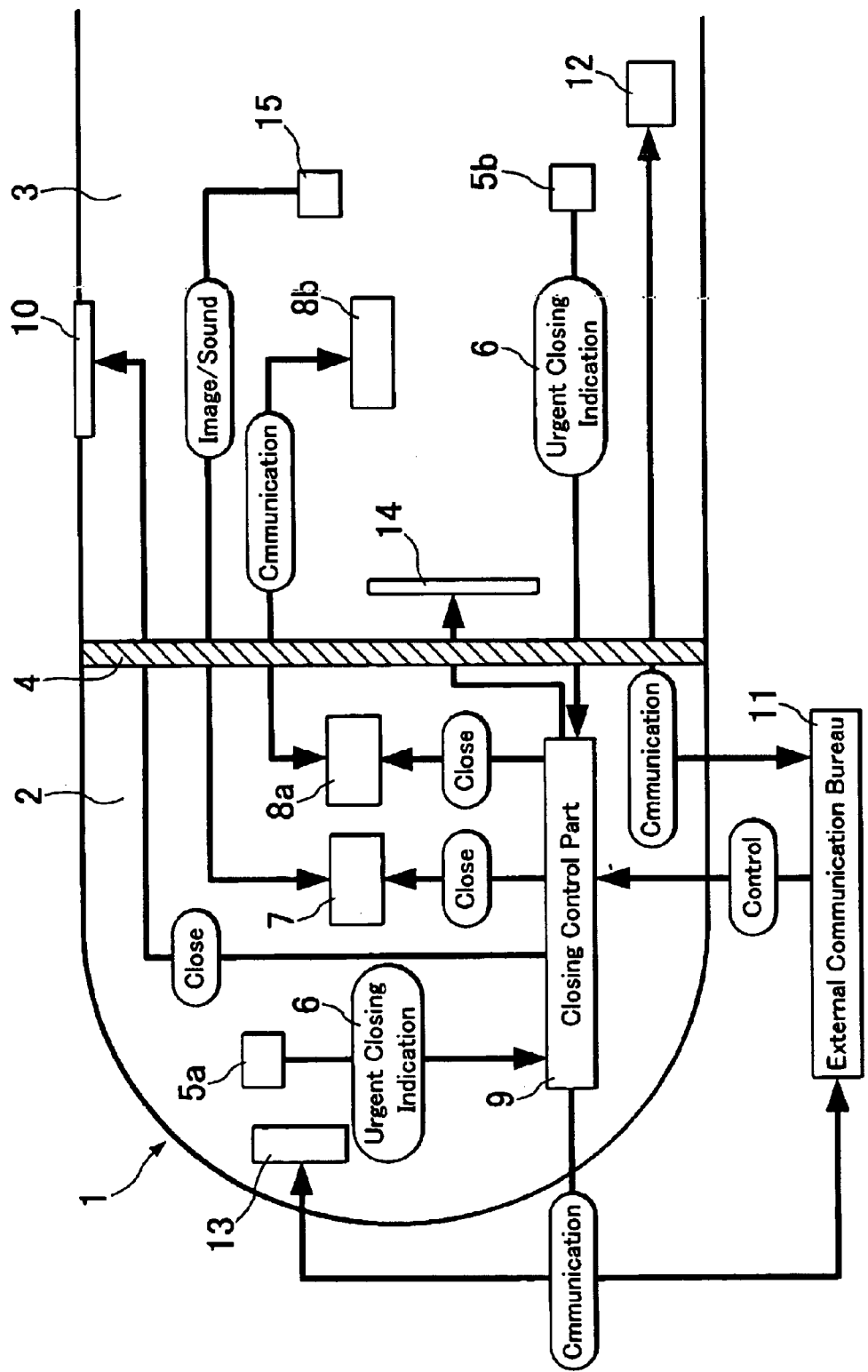
FIG. 1 is a schematic structural view showing a first embodiment of the present invention.

Preferred embodiments of the present invention are described in more detail below with reference to the accompanying drawings. FIG. 1 illustrates an aircraft in accordance with a first embodiment of the present invention. The numeral 1 shows the aircraft which includes a cover wall 4 without a door so that passengers cannot go back and forth a flight deck 2 and a cabin 3. Means for indicating urgent closing 5a and 5b are installed in both the flight deck 2 and the cabin 3 or carried by the flight attendants. A closing control part 9 is provided which closes information machines and equipment inside the plane including an image and sound monitor 7 which ordinarily projects the situation of the cabin 3 and communication means 8a and 8b, so that the acting information of the passengers in the cabin 3 is not transmitted to the flight deck 2 at all when an urgent closing indication 6 is transmitted from either of the urgent closing indication means 5a or 5b. A window shutter 10 is installed in all windows of the cabin 3, which closes and locks when the urgent closing indication 6 is transmitted. Means for communicating outside at cabin side 12 are also installed at the cabin side, and which allows or communication with an external communication bureau 11, including the control tower, terrorism measure room and a military communication institution.

When the urgent closing, in response to the urgent closing indication 6, is performed, communication and negotiation with the external communication bureau 11 can only be performed by the hijacker through the cabin side external communication means 12. A pilot can communicate with the external communication bureau 11 by a flight deck side external communication means 13.

After the information devices are closed in response to the urgent closing indication 6, the phrases including, for example, "all means to perform communication with a flight deck were closed", "sound not getting across to a flight deck at all by sound-protection wall and the sound-protection door" and "there is no way to cancel the closing in the inside of the airplane", etc. are reported by information means 14 in a plurality of languages.

Moreover, the closing state of information machines and equipment inside the plane including the communication means 8, image and a sound monitor 7, window shutter 10 and so on can be canceled individually and closed down again by the external communication bureau 11.

Other embodiments of the present invention will now be described with reference to FIGS. 2–5. In FIGS. 2–5, the same components as in the first embodiment described above with reference to FIGS. 2–5 are designated by the same reference numerals and therefore will not be further explained in great detail.

Figure 2:
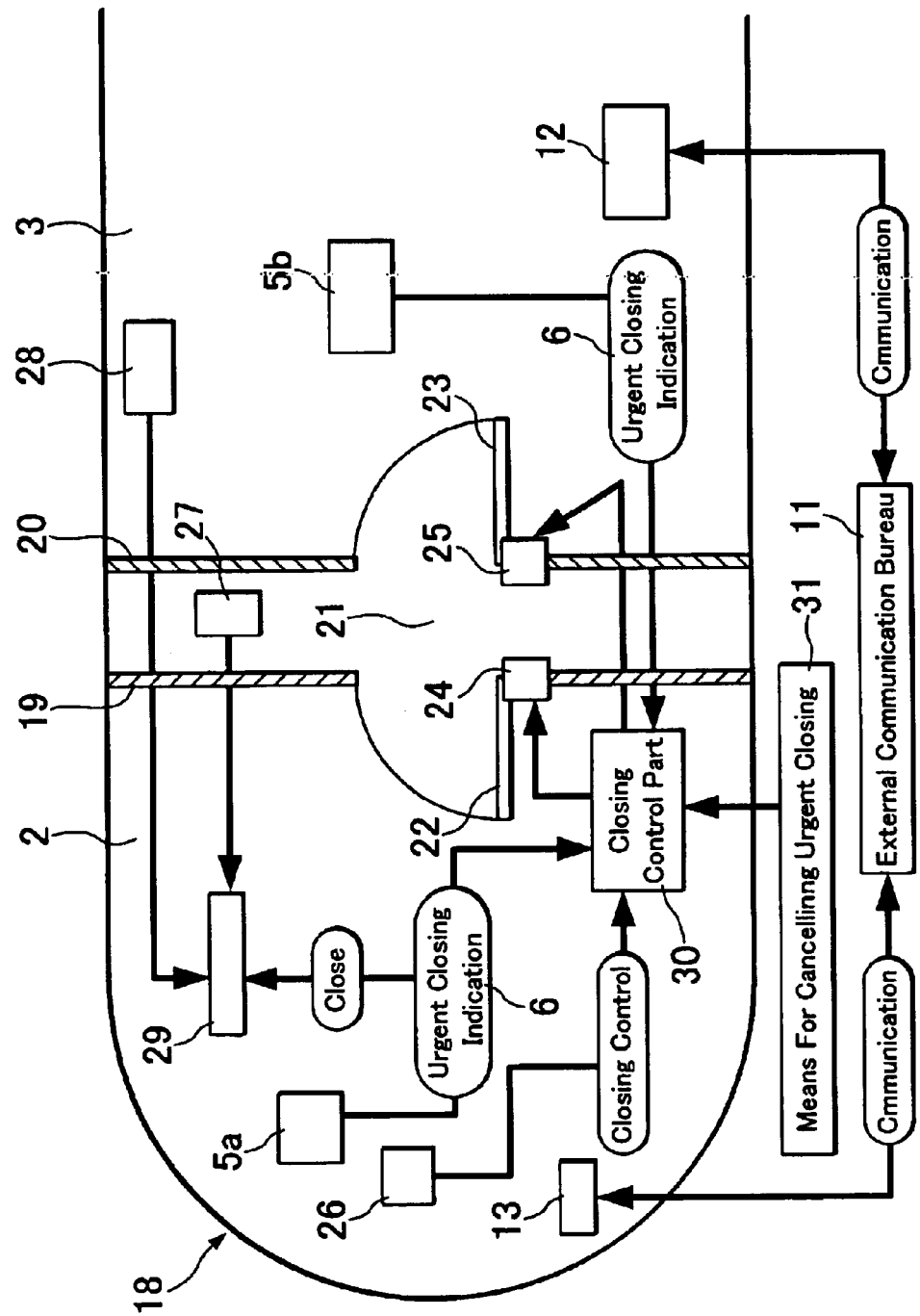
FIG. 2 is a schematic structural view showing a second embodiment of the present invention.

A second embodiment of the present invention is shown in FIG. 2. It is distinguished from the first embodiment in that the numeral 18 shows an aircraft and includes a first partition wall 19, with the sound-protection structure, dividing the flight deck 2 and cabin 3, and a second partition wall 20, with the sound-protection structure, dividing the flight deck 2 and cabin 3. A standby room 21 is provided between the first partition wall 19 and second partition wall 20. A first door 22, with the sound-protection structure, is provided in the first partition wall 19, and a second door 23, with the sound-protection structure, is provided in the second partition wall 20. Means 24 for locking the first door 22; means 25 for locking the second door 23; a door control part 26 which control to close one of the doors 22 or 23 when another of the doors 22 or 23 is opened, controlled to open, close and lock each door from the flight deck side artificially. Means for indicating urgent closing 5a and 5b are installed in both the flight deck 2 and the cabin 3, indicate the urgent closing; a closing control part 30 which closes and locks the first door 22 and second door 23 by the acting of the locking means 24 and 25 and closes the information machines including a standby room camera 27, monitor 29 which projects the image from a cabin camera 28 and communication device (not shown) used between the flight deck and cabin when the urgent closing indication 6 is performed by the indicating urgent closing means 5a and 5b. Means 31 for canceling the urgent closing are provided outside the aircraft 18, and cancel the urgent blockade state when the aircraft 18 is landed. Means 12 for communicating outside the aircraft are provided at the cabin, and are capable of contacting the external communication bureau 11.

Controlling and indicating of the door control part 26 cannot cancel the locked state of the door closed in response to the urgent closing indication 6.

Figure 3:
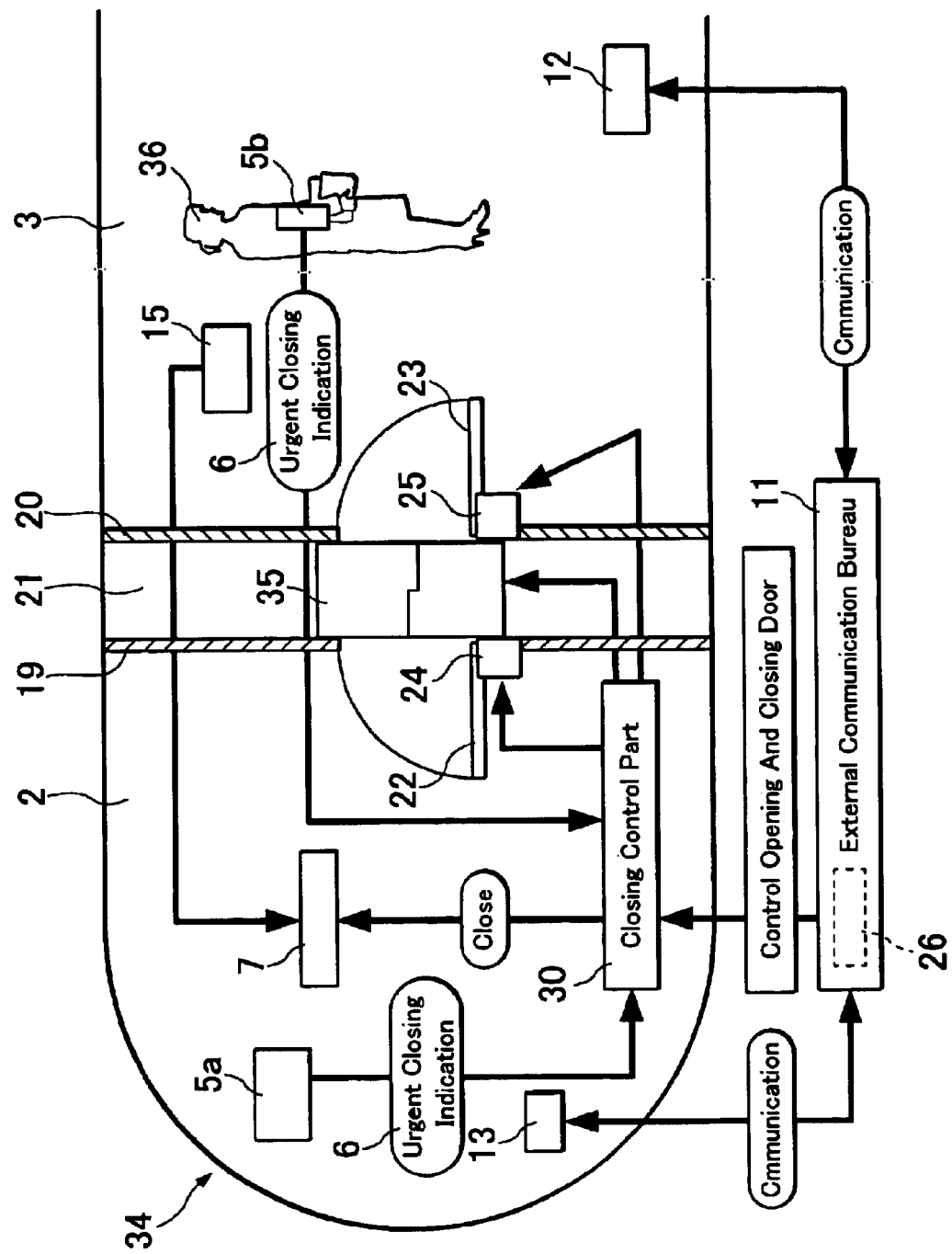
FIG. 3 is a schematic structural view showing a third embodiment of the present invention.

A third embodiment of the present invention is shown in FIG. 3. It is distinguished from the second embodiment in that the numeral 34 shows an aircraft, the external communication bureau 11 has the function of the door control part 26, and the standby room 21 further includes a crime prevention shutter 35 divided by two parts with a horizontal movement. The crime prevention shutter 35 can move inside powered by a motor (not shown) built thereinto in response to the urgent closing indication 6 and close an entrance completely, and the closing thereof cannot be canceled from inside. The flight attendant 36 has the urgent closing indication means 5b.

Figure 4:
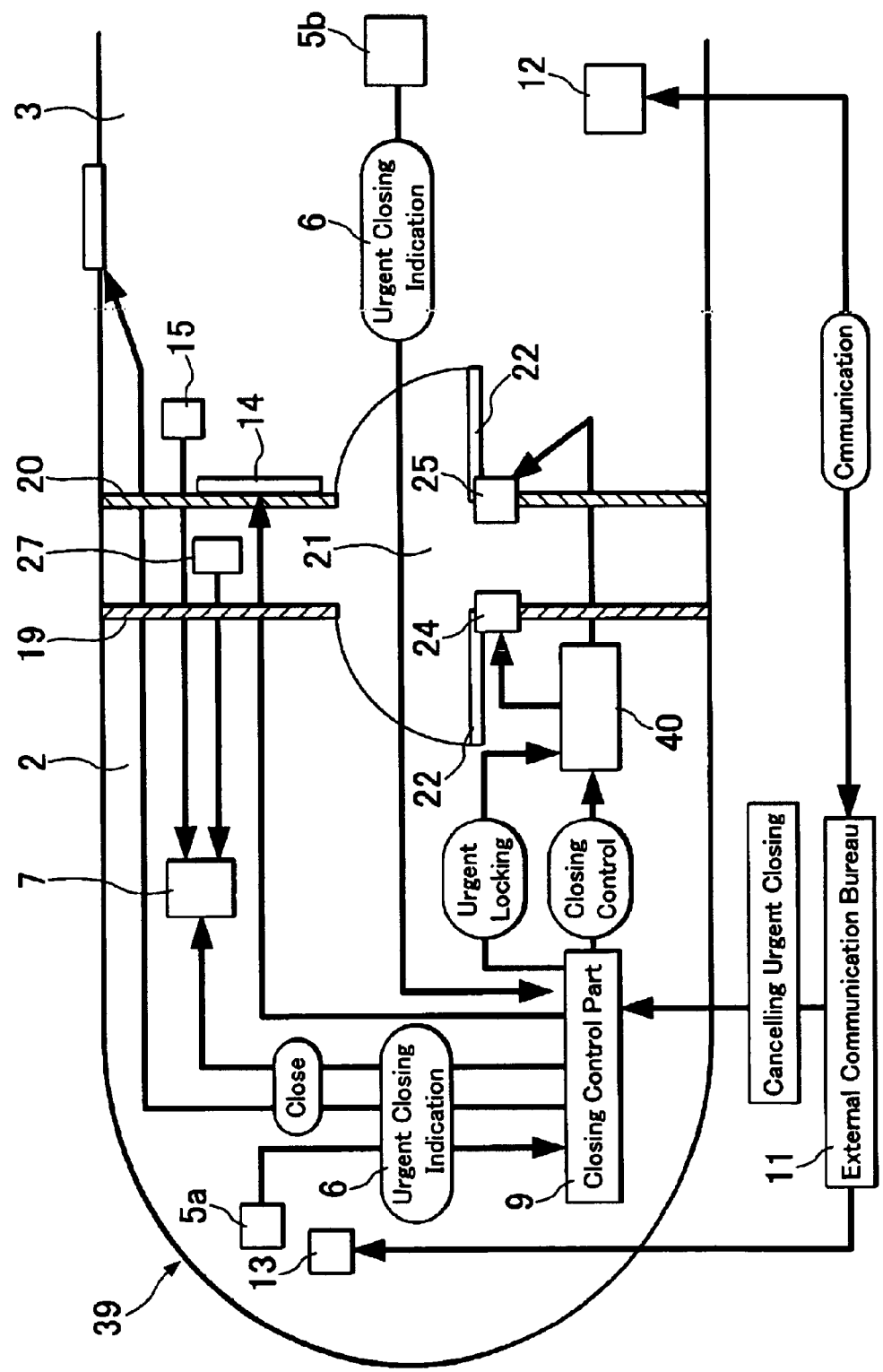
FIG. 4 is a schematic structural view showing a fourth embodiment of the present invention.

A fourth embodiment of the present invention is shown in FIG. 4. It is distinguished from the second embodiment in that the numeral 39 shows a aircraft, the external communication bureau 11 has the function of the door control part 26, and can cancel individually the urgent lock state of the information machines and equipment and urgent closing state of the door etc. by wireless radio control and can close same individually or all at once. The numeral 40 shows a door control part.

Figure 5:
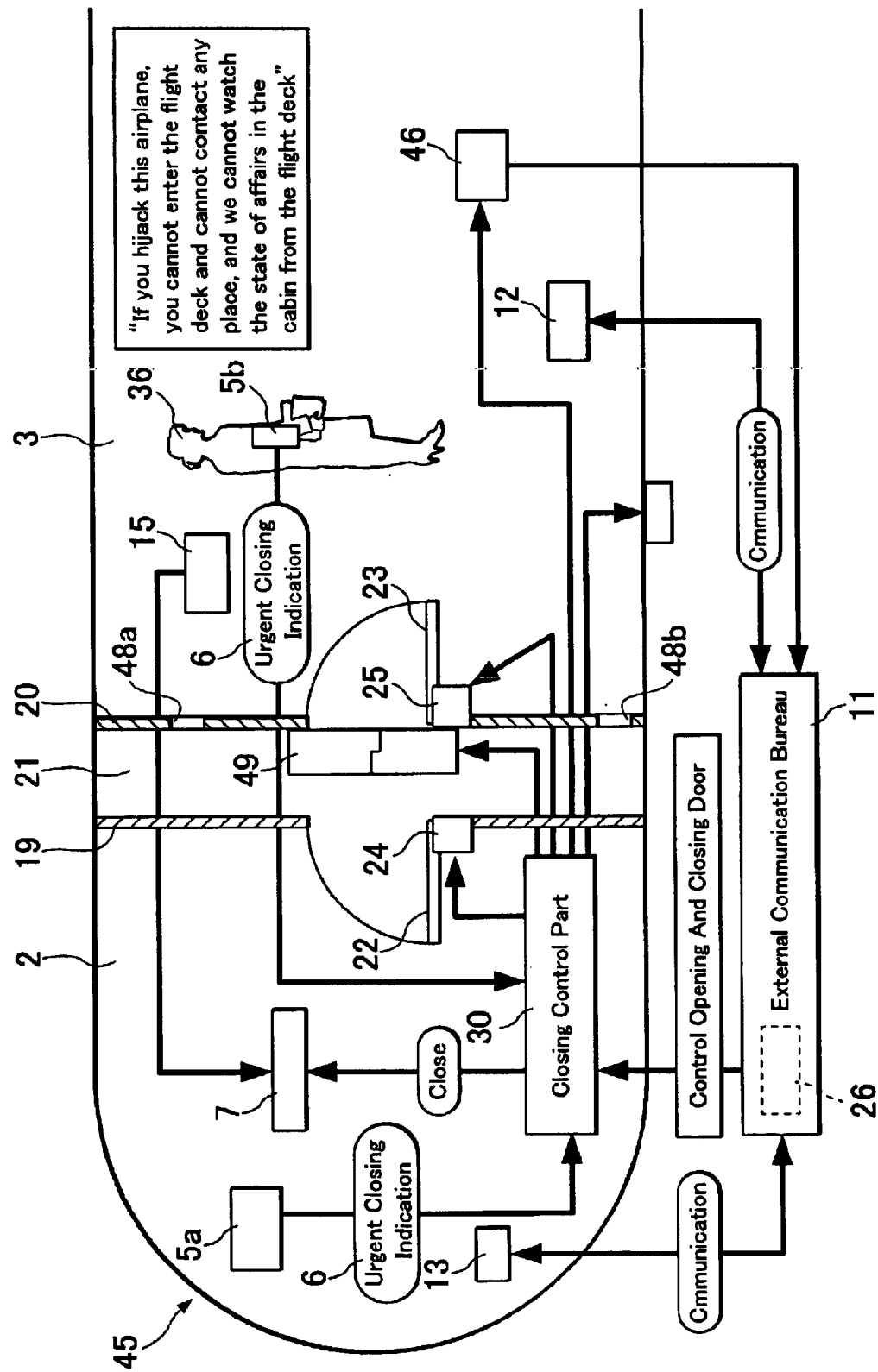
FIG. 5 is a schematic structural view showing a fifth embodiment of the present invention.

A fifth embodiment of the present invention is shown in FIG. 5. It is distinguished from the third embodiment in that the numeral 45 shows an aircraft and further includes means for getting and transmitting secret information 46 which operate automatically when there is an urgent closing indication 6 and transmit the image and sound of the cabin to the external communication bureau 11, including a hidden television camera, a hidden collection sound means, an information transmitting means, and a record means. An urgent blink light 47 is attached to the outer part of the aircraft body, blinking urgently when there is a urgent closing indication 6. A sniping windows 48a and 48b is provided at the second partition wall 20. Additionally, means are provided for indicating "If you hijack this airplane, you cannot enter the flight deck and cannot contact any place, and we cannot watch the state of affairs in the cabin from the flight deck".

The indication means may urge sounding of the alarm, including blinking automatically after the urgent closing indication means 5a or 5b are activated.

The crime prevention shutter 49 has a width that can be invaded into the standby room 21 from the flight deck 2, the sniper passes through the first door 22 opened by control of the external communication bureau 11, invades in the standby room 21 and snipes a hijacker from the sniping windows 48a and 48b.

In this case, in order to receive the information signal from the information acquisition transmitting means 46, communicate with a flight deck without a break and give a suitable indication, the military airplane with required communication equipment and shooting-down capability as the external communication bureau may be used.

In addition, although this invention relates to the aircraft, these structures also include the invention of a passenger crime prevention system including the external communication bureau.

As set forth above, the advantages of the invention are as follows:

(1) An aircraft comprises a cover wall without the door so that passengers cannot go back and forth between a flight deck and a cabin; means for indicating an urgent closing provided in one of the flight deck and cabin; a closing control part which closes information machines and equipment so that information regarding activity of the passengers in the cabin does not transmit to the flight deck when the urgent closing indication means indicates an urgent closing state; and means for communicating outside of the aircraft being provided at the cabin, communicating with an external communication bureau including a control tower and communication device so that the hijacker can not invade into the flight deck in order to be protected by the cover wall so that the aircraft does not result in a crash by the suicidal-explosion terrorism and death of the crew.

(2) As discussed above, the urgent closing indication means indicates and the information devices is closed so as not to transmit information on the activity of the people who are in the cabin to the flight deck when the hijack is happened so that the crew in the flight deck can safely pilot the aircraft without hesitation.

Therefore, since negotiation with a hijacker is performed by the external communication bureau, such as an airplane equipped with a control tower or communication equipment by the external communication means provided at the cabin, and flight plan is generally indicated in the flight deck from the external communication bureau so that most suitable correspondence according to the demand of a hijacker or the situation can be performed (3) As discussed above, such structure and system is well-known, so that it is understood that the aircraft can not be performed for suicidal-explosion terrorism and the hijacker communicates only with the external communication bureau and cannot have the leadership even if hijacked, and therefore can deter the hijacking.

(4) As discussed above, since the operation and flight of the aircraft are piloted by the flight deck which is not influenced by the hijacker, it can move safely to airspace where not having a ground institution, save time to parallel flight of the external communication bureau when the external communication bureau is used as the airplane, and select the nearest flight route, etc.

It is noted that the invention also contemplates a crime prevention system which includes the combination of an aircraft and an external communication bureau.

What is claimed is:

1. An aircraft, comprising:

a flight deck and a cabin in which passengers are receivable;

a cover wall without a door so that the passengers cannot go back and forth between said flight deck and said cabin;

urgent closing indication means for indicating an urgent closing provided in at least one of the flight deck and the cabin;

a closing control part which closes information machines and equipment so that information regarding activity of the passengers in the cabin does not transmit to the flight deck when the urgent closing indication means indicates an urgent closing state; and means for communicating with a facility located outside of the aircraft provided at the cabin.

2. An aircraft, comprising:

a flight deck and a cabin in which passengers are receivable;

a partition wall with sound-protection structure, said partition wall dividing the flight deck from the cabin;

a door with sound-protection structure, said door being provided in the partition wall;

means for locking the door;

urgent closing indication means for indicating an urgent closing provided in at least one of the flight deck and cabin;

a closing control part for closing and locking the door by operation of the door locking means and for closing information machines and equipment so that information regarding activity of the passengers in the cabin does not transmit to the flight deck when the urgent closing indication means indicates an urgent closing state; and means for communicating with a facility located outside of the aircraft provided at the cabin.

3. An aircraft, comprising:

a flight deck and a cabin in which passengers are receivable;

a first partition wall with sound-protection structure, said first partition wall dividing the flight deck from the cabin;

a second partition wall with sound-protection structure, said second partition wall dividing the flight deck from the cabin;

a standby room provided between the first partition wall and second partition wall;

a first door with sound-protection structure provided in the first partition wall;

a second door with sound-protection structure provided in the second partition wall;

means for locking the first door;

means for locking the second door;

a door control part for controlling closure of one of first and second doors when another of said first and second doors is opened, controlled to open, closing and locking each door from the flight deck side artificially;

urgent closing indication means for indicating an urgent closing provided in at least one of the flight deck and the cabin;

a closing control part for closing and locking the first door and second door by operation of the door locking means and for closing the information machines, including when an urgent closing state is indicated by the urgent closing indication means; and means for communicating with a facility located outside of the aircraft provided at the cabin.

4. An aircraft according to any of claims 2 and 3, wherein the facility includes an external communication bureau which can open, close and cancel an urgent locking state of the door and the information machines by wireless radio control.

5. An aircraft according to any of claims 2 and 3, wherein a locking state of the door and a closing state of the information machines initiated by indication of the urgent closing state are not canceled from inside the aircraft.

6. An aircraft according to any of claims 2 and 3, further comprising:

a crime prevention shutter for closing an entrance provided between the flight deck and the cabin; and means for closing and locking the crime prevention shutter in response to indication of the urgent closing state.

7. An aircraft according to any of claims 1, 2 and 3, further comprising:

a window shutter installed in all windows of the cabin; and means for closing and locking the window shutter in response to indication of the urgent closing state.

8. An aircraft according to any of claims 1, 2 and 3, further comprising means for informing by at least one of an announcement and a monitor an effect of the urgent closing state by a suitable phrase indicating at least one of a fact that all means to perform communication with the flight deck were closed, that sound is not getting across to the flight deck at all by the sound-protection of the wall and the door and that there is no way to cancel the closing from the inside of the aircraft, said means for informing being operated when the door is locked when the urgent closing state is indicated.

9. An aircraft according to any of claims 1, 2 and 3, further comprising:

at least one of a hidden television camera and means for collecting sound attached to structure at the cabin; and means for transmitting information obtained by said at least one of the hidden television camera and the means for collecting sound to a location outside of the aircraft.

10. An aircraft according to any of claims 1, 2 and 3, further comprising:

a light attached to an outer part of the aircraft body for indicating the urgent closing state when blinking; and means for blinking the light when the urgent closing state is indicated.

11. An aircraft according to any of claims 1, 2 and 3, further comprising means for indicating by a suitable phase that if the aircraft is hijacked, that access to and contact with to the flight deck will be prevented from the cabin and that the flight deck will not be aware of activities in the cabin.

12. An aircraft according to any of claims 1, 2 and 3, wherein said facility includes an external communication bureau including a control tower and a communication device.

* * * * *